(12) United States Patent
Lu et al.

(10) Patent No.: US 10,913,863 B2
(45) Date of Patent: Feb. 9, 2021

(54) CESIUM TUNGSTEN BRONZE-BASED SELF-CLEANING NANO HEAT-INSULATION COATING MATERIAL AND PREPARATION METHOD THEREOF

(71) Applicant: The Hong Kong Polytechnic University, Kowloon (CN)

(72) Inventors: Lin Lu, Kowloon (CN); Yuanhao Wang, Kowloon (CN); Hong Zhong, Kowloon (CN); Yan Hu, Hung Hom (CN)

(73) Assignee: The Hong Kong Polytechnic University, Kowloon (CN)

( * ) Notice: Subject to any disclaimer, the term of this patent is extended or adjusted under 35 U.S.C. 154(b) by 363 days.

(21) Appl. No.: 15/909,079

(22) Filed: Mar. 1, 2018

(65) Prior Publication Data

US 2018/0340082 A1  Nov. 29, 2018

(30) Foreign Application Priority Data

May 25, 2017 (CN) .......................... 2017 1 0395687

(51) Int. Cl.
| | | |
|---|---|---|
| *C09D 5/16* | (2006.01) | |
| *C09D 1/00* | (2006.01) | |
| *C09D 7/40* | (2018.01) | |
| *B22F 1/00* | (2006.01) | |
| *B22F 9/04* | (2006.01) | |
| *B22F 9/24* | (2006.01) | |
| *C23C 24/08* | (2006.01) | |
| *C22C 32/00* | (2006.01) | |
| *C22C 1/04* | (2006.01) | |
| *C22C 27/04* | (2006.01) | |
| *B22F 7/04* | (2006.01) | |

(52) U.S. Cl.
CPC .......... *C09D 5/1681* (2013.01); *B22F 1/0018* (2013.01); *B22F 9/04* (2013.01); *B22F 9/24* (2013.01); *C09D 1/00* (2013.01); *C09D 7/67* (2018.01); *C22C 1/045* (2013.01); *C22C 32/0031* (2013.01); *C23C 24/08* (2013.01); *B22F 7/04* (2013.01); *B22F 2009/043* (2013.01); *B22F 2301/20* (2013.01); *B22F 2304/05* (2013.01); *B22F 2998/10* (2013.01); *C22C 27/04* (2013.01)

(58) Field of Classification Search
CPC ... C09D 7/67; C09D 7/20; C09D 7/61; C09D 7/45; C09D 1/00; C09D 5/00
See application file for complete search history.

(56) References Cited

U.S. PATENT DOCUMENTS

| | | | |
|---|---|---|---|
| 6,328,947 B1 * | 12/2001 | Monden ................. | B82Y 30/00 423/608 |
| 2010/0219654 A1 * | 9/2010 | Fujita ..................... | B60J 1/00 296/97.7 |
| 2017/0183240 A1 * | 6/2017 | Lin ........................ | C01G 41/00 |

* cited by examiner

*Primary Examiner* — C Melissa Koslow
(74) *Attorney, Agent, or Firm* — BakerHostetler

(57) ABSTRACT

The present disclosure provides a cesium tungsten bronze-based self-cleaning nano heat-insulation coating material, and method of preparing the same. Cesium tungsten bronze nanoparticles are prepared by hydrothermal method using $WCl_6$ and $CsOH \cdot 5H_2O$ as raw materials, PVP as a surfactant and acetic acid as an acid catalyst. $TiO_2$ nanoparticles are prepared from $TiCl_4$. Subsequently ball milling and dispersing of the cesium tungsten bronze nanoparticles, the $TiO_2$ nanoparticles, and a silane coupling agent with water to obtain an aqueous slurry containing cesium tungsten bronze/$TiO_2$ composite particles is performed. The concentration of the aqueous slurry containing cesium tungsten bronze/$TiO_2$ composite particles is adjusted to obtain a self-cleaning nano heat-insulation coating material.

7 Claims, 3 Drawing Sheets

CESIUM TUNGSTEN BRONZE-BASED SELF-CLEANING NANO HEAT-INSULATION COATING MATERIAL AND PREPARATION METHOD THEREOF

TECHNICAL FIELD

The present disclosure relates to the field of coating materials, and in particular to a cesium tungsten bronze-based self-cleaning nano heat-insulation coating material and method of preparing the same.

BACKGROUND

It is reported that building energy consumption accounts for 40% of the global energy consumption, and more than 50% of the building energy consumption comes from the energy consumption of air conditioners. Particularly in China, heating, air conditioners, fans and household appliances account for 95% of the building energy consumption. Therefore, heat insulation is of great significance in reducing building energy consumption. In order to ensure adequate indoor lighting and aesthetic appearance of the buildings, large-area windows or glass curtain walls are increasingly common in modern buildings to replace the previous concrete structures. As such, cooling in summer and heating in winter will inevitably cause extra energy consumption. Without reducing the area of building glass, the goal of energy saving can be achieved by improving the heat insulation performance of glass. A lot of attempts and researches have been made on glass insulation in China and abroad. At present, mainstream energy-saving and heat-insulation products include heat reflective coated glass, vacuum glass, hollow glass and so on. Heat reflective coated glass has a notable heat insulation performance, but causes problem of light pollution due to its high reflectivity of visible light. Though the hollow glass achieves a certain heat insulation effect, the heat insulation performance is unsatisfactory. On the basis of hollow glass, vacuum glass achieves thermal insulation by removing the air in the gap between the glasses. This kind of glass requires good airtightness and is expensive. Filmed glass is glass with a film made from an infrared shielding material attached onto its surface. This technology provides a good solution to the problem associated with the heat insulation of glass; however, the cost is extremely high, and thus this technology cannot be widely used.

Cesium tungsten bronze has good visible light transmittance and infrared absorption characteristics, and thus receives extensive attentions. Novel transparent heat-insulation coating material, which may be prepared with cesium tungsten bronze, is currently not available in the market. Its poor dispersibility is a main factor limiting its application. Moreover, most of the heat-insulation coating materials currently available in the market are oil-based heat-insulation coating materials having a high content of volatile organic compounds (VOCs), which causes hazards to the health of construction workers and users. Therefore, there is a need for developing a water-based transparent heat-insulation coating material having excellent visible light transmittance and good dispersibility.

SUMMARY

In view of the above technical problems, the present disclosure provides a cesium tungsten bronze-based self-cleaning nano heat-insulation coating material and method of preparing the same.

The present disclosure provides a method for preparing a cesium tungsten bronze-based self-cleaning nano heat-insulation coating material, which comprises:

preparing cesium tungsten bronze nanoparticles by hydrothermal method using $WCl_6$ and $CsOH.5H_2O$ as raw materials, PVP as a surfactant and acetic acid as an acid catalyst;

preparing $TiO_2$ nanoparticles from $TiCl_4$ solvothermally; and ball milling and dispersing the cesium tungsten bronze nanoparticles, the $TiO_2$ nanoparticles, a silane coupling agent and water to obtain an aqueous slurry containing cesium tungsten bronze/$TiO_2$ composite particles; and adjusting the concentration of the aqueous slurry containing cesium tungsten bronze/$TiO_2$ composite particles, to obtain a self-cleaning nano heat-insulation coating material.

In the preparation method according to the present disclosure, preparing cesium tungsten bronze nanoparticles comprises:

stirring 10-15 parts by weight of $WCl_6$, 2-4 parts by weight of $CsOH.5H_2O$, 30-40 parts by weight of acetic acid, and 15-20 parts by weight of PVP together, to obtain a first mixture; and heating the first mixture to 70° C.-80° C., and maintaining this temperature for 1 h-2 h; and then heating the first mixture further to 220° C.-240° C., and reacting for 20 h-30 h at this temperature, followed by centrifugation and oven drying to obtain the cesium tungsten bronze nanoparticles.

In the preparation method according to the present disclosure, preparing $TiO_2$ nanoparticles comprises:

mixing 10-15 parts by weight of $TiCl_4$ and 30-40 parts by weight of anhydrous ethanol solvothermally, to obtain a second mixture; and then reacting the second mixture at 180° C. for 8 h, followed by centrifuging and oven drying, to obtain $TiO_2$ nanoparticles.

In the preparation method according to the present disclosure, ball milling and dispersing may comprises:

ball milling 40-50 parts by weight of cesium tungsten bronze nanoparticles, 5-10 parts by weight of $TiO_2$ nanoparticles, 1-2 parts by weight of sodium polyacrylate coupling agent (SN5040) and 40-50 parts by weight of deionized water, to obtain an aqueous slurry containing cesium tungsten bronze/$TiO_2$ composite particles.

In the preparation method according to the present disclosure, the rotation speed of the ball mill machine for ball milling is 500 r/min-5000 r/min, and the ball milling time is 4 h-12 h.

The present disclosure further provides a self-cleaning nano heat-insulation coating material prepared from the method described above.

In the present disclosure, cesium tungsten bronze nanoparticles are prepared through hydrothermal method.

The cesium tungsten bronze nanoparticles have a large specific surface area, thus having a positive effect on the improvement of infrared absorptivity. The $TiO_2$ nanoparticles have good dispersibility in water, and virtually do not block visible light.

Further, in the present disclosure, an aqueous slurry containing cesium tungsten bronze/$TiO_2$ composite particles may be prepared by ball milling and dispersing, in which the well-dispersed cesium tungsten bronze nanoparticles and $TiO_2$ nanoparticles are beneficial to the improvement of the visible light transmittance and the infrared blocking performance of the coating.

A coating obtained by applying the self-cleaning nano heat-insulation coating material of the present disclosure has a good hydrophilicity, which effectively prevents contamination of the nano-coating by organic oils and inorganic dusts, thereby greatly enhancing the anti-fouling performance and extending the service life of the coating.

The self-cleaning nano heat-insulation coating material of the present disclosure is a water-based heat-insulation coating material, which has low content of volatile organic compounds (VOCs) and causes no hazards to the environment and the health of construction workers and users.

BRIEF DESCRIPTION OF THE DRAWINGS

The present disclosure will be further described in connection with embodiments with reference to the accompanying drawings, in which.

DETAILED DESCRIPTION

Figure 1:
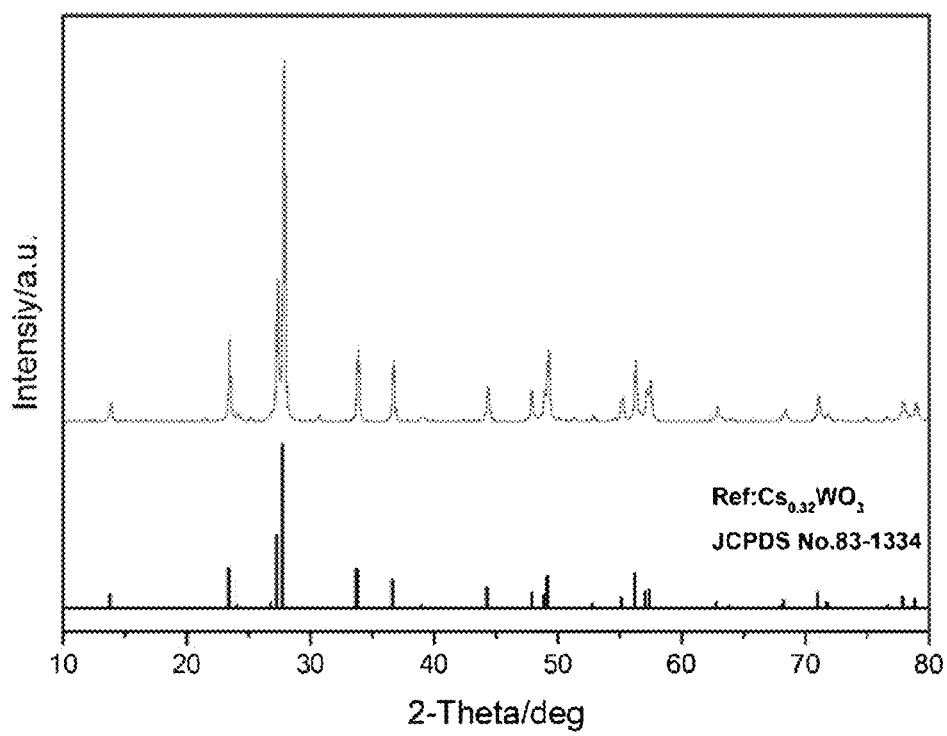
FIG. 1 shows the XRD spectrum of cesium tungsten bronze nanoparticles prepared according to the present disclosure.

Novel transparent heat-insulation coating material prepared with cesium tungsten bronze is currently not available in the market due its poor dispersibility which limits its application. However, the present disclosure provides a cesium tungsten bronze-based self-cleaning nano heat-insulation coating material and method of preparing the same. The heat-insulation coating material is a water-based coating material having excellent light transmittance and good dispersibility.

The method for preparing the self-cleaning nano heat-insulation coating material provided comprises preparing cesium tungsten bronze nanoparticles by hydrothermal method using $WCl_6$ and $CsOH.5H_2O$ as raw materials, polyvinyl pyrrolidone (PVP) as a surfactant and acetic acid as an acid catalyst; then preparing $TiO_2$ nanoparticles by solvothermally hydrolyzing $TiCl_4$ which acts as a major raw material; and finally, ball milling and dispersing the cesium tungsten bronze nanoparticles, the $TiO_2$ nanoparticles, a silane coupling agent, and water to obtain an aqueous slurry containing cesium tungsten bronze/$TiO_2$ composite particles, and adjusting the concentration of the aqueous slurry containing cesium tungsten bronze/$TiO_2$ composite particles, to obtain a self-cleaning nano heat-insulation coating material. Herein, the aqueous slurry containing cesium tungsten bronze/$TiO_2$ composite particles is dispersed by high-speed shearing and ultrasonically.

In a further embodiment, the preparation process for cesium tungsten bronze nanoparticles comprises:

stirring 10-15 parts by weight of $WCl_6$, 2-4 parts by weight of $CsOH.5H_2O$, 30-40 parts by weight of acetic acid, and 15-20 parts by weight of PVP together, to obtain a first mixture; and heating the first mixture to 70° C.-80° C., and maintaining this temperature for 1 h-2 h; and then heating the first mixture further to 220° C.-240° C., and reacting for 20 h-30 h at this temperature, followed by centrifugation and oven drying, to obtain the cesium tungsten bronze nanoparticles.

Herein, suitable amount of water may be added to the first mixture. The first mixture is heated in a reactor having an internal lining made with a material that does not react with the first mixture. Preferably, the internal lining of the reactor is made from p-polyphenol (PPL). It should be understood that polytetrafluoroethylene (PTFE) may also be used as the internal lining of the reactor.

In a further embodiment, the preparation process of $TiO_2$ particles comprises:

mixing 10-15 parts by weight of $TiCl_4$ and 30-40 parts by weight of anhydrous ethanol solvothermally, to obtain a second mixture; and then reacting the second mixture at 180° C. for 8 h, followed by centrifuging and oven drying, to obtain $TiO_2$ nanoparticles.

Herein, the second mixture is also heated in a reactor having an internal lining made with a material that does not react with the second mixture. Preferably, the internal lining of the reactor is made with p-polyphenol (PPL). It should be understood that polytetrafluoroethylene (PTFE) may also be used as the internal lining of the reactor.

Further, the preparation process for the aqueous slurry containing cesium tungsten bronze/$TiO_2$ composite particles comprises ball milling 40-50 parts by weight of cesium tungsten bronze nanoparticles, 5-10 parts by weight of $TiO_2$ nanoparticles, 1-2 parts by weight of sodium polyacrylate coupling agent (SN5040) and 40-50 parts by weight of deionized water, to obtain an aqueous slurry containing cesium tungsten bronze/$TiO_2$ composite particles.

During the preparation of the aqueous slurry containing the cesium tungsten bronze/$TiO_2$ composite particles, the rotation speed of the ball mill machine for ball milling is 500 r/min-5000 r/min, and the ball milling time is 4 h-12 h.

The concentration of the aqueous slurry containing cesium tungsten bronze/$TiO_2$ composite particles can be adjusted through evaporation using a rotary evaporator, or by adjusting the amount of water used in the preparation of the aqueous slurry containing cesium tungsten bronze/$TiO_2$ composite particles, or through other methods.

In order to make the technical objectives, technical solutions and technical effects of the present disclosure clearer so that those skilled in the art can understand and implement the present disclosure, the present disclosure will be further described in detail below with reference to the accompanying drawings and specific embodiments.

Figure 2:
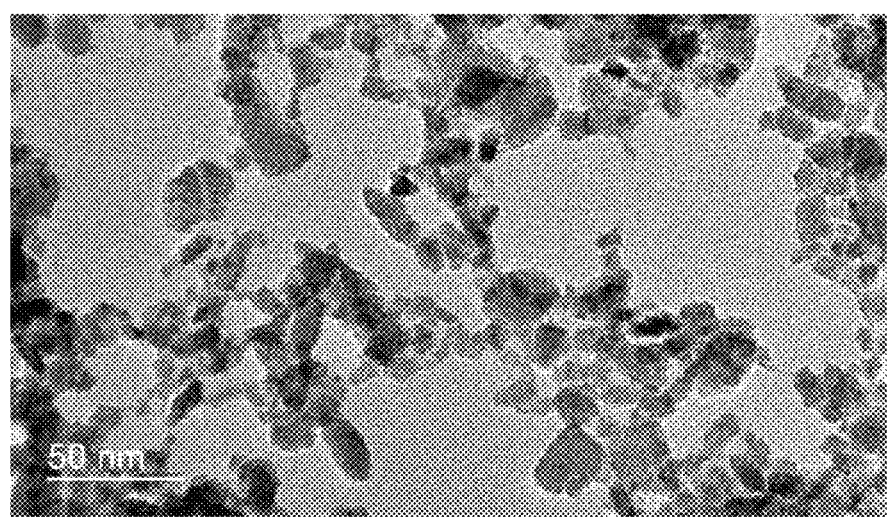
FIG. 2 shows the TEM image of cesium tungsten bronze nanoparticles prepared according to the present disclosure.

First Example 10 parts by weight of $WCl_6$, 2 parts by weight of $CsOH.5H_2O$, 35 parts by weight of acetic acid and 15 parts by weight of PVP were stirred together to obtain a first mixture. The first mixture was heated to 80° C. and maintained at this temperature for 2 h. Then, the first mixture was further heated to 220° C., reacted for 20 h at this temperature, then centrifuged and oven dried, to obtain cesium tungsten bronze nanoparticles. The cesium tungsten bronze nanoparticles were analyzed by XRD, as shown in FIG. 1, and by TEM, as shown in FIG. 2. It can be seen that the average diameter is 20 nm.

Figure 3:
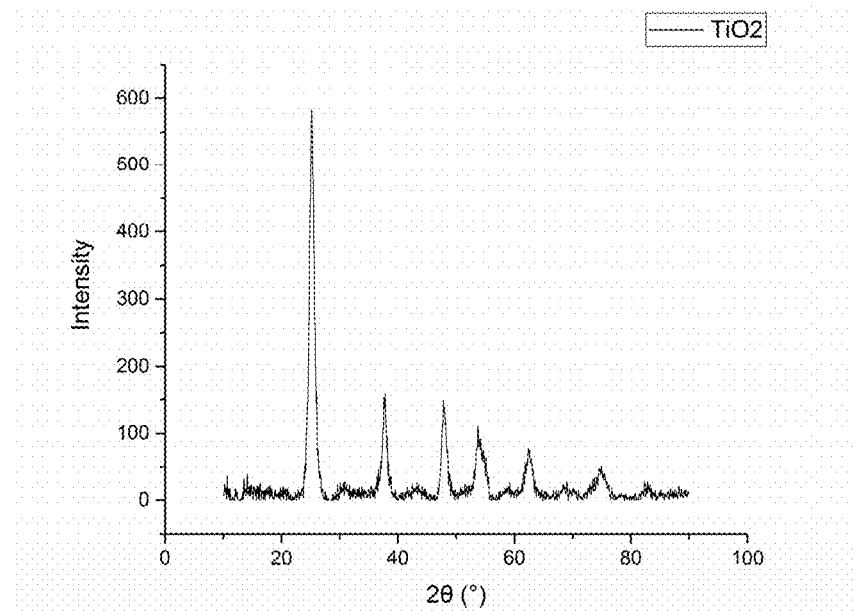
FIG. 3 shows the XRD spectrum of $TiO_2$ nanoparticles prepared according to the present disclosure.
Figure 4:
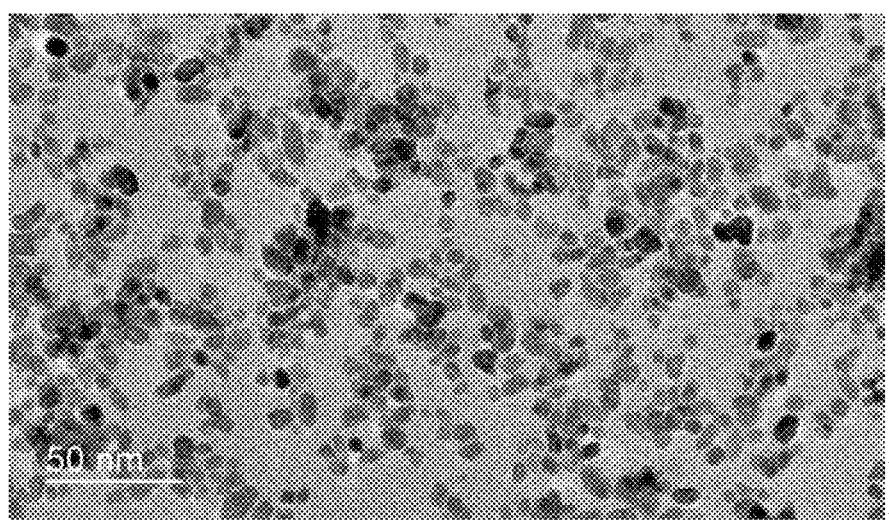
FIG. 4 shows the TEM image of $TiO_2$ nanoparticles prepared according to the present disclosure.

10 parts by weight of $TiCl_4$ and 30 parts by weight of anhydrous ethanol were mixed, to obtain a second mixture. Then, the second mixture was reacted at 180° C. for 8 h, and then centrifuged and oven dried, to obtain $TiO_2$ nanoparticles. The $TiO_2$ particles were analyzed by XRD, as shown in FIG. 3, and by TEM, as shown in FIG. 4. It can be seen that the average diameter is 12 nm.

40 parts by weight of the cesium tungsten bronze nanoparticles, 5 parts by weight of the $TiO_2$ nanoparticles, 1 parts by weight of sodium polyacrylate coupling agent (SN5040) and 40 parts by weight of deionized water were ball milled, to obtain an aqueous slurry containing cesium tungsten bronze/$TiO_2$ composite particles, which is used as a self-cleaning nano heat-insulation coating material.

The self-cleaning nano heat-insulation coating material is uniform and stable.

Figure 5:
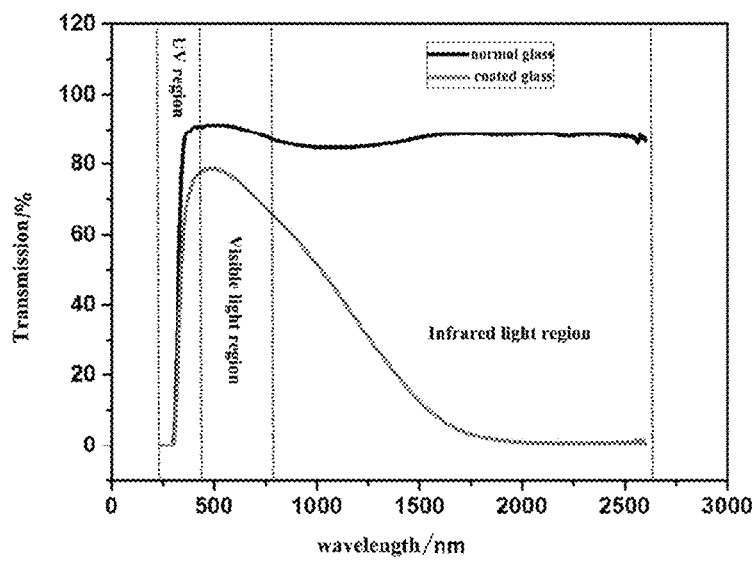
FIG. 5 is the light transmittance curve of a self-cleaning nano heat-insulation coating.

A self-cleaning nano heat-insulation coating was formed with the self-cleaning nano heat-insulation coating material using a spin coater. Then, light transmittance curve of the self-cleaning nano heat-insulation coating was measured, as shown in FIG. 5. From FIG. 5, it can be seen that the self-cleaning nano heat-insulation coating has a visible light transmittance of about 80%, and an infrared blocking rate of about 85%.

Figure 6:
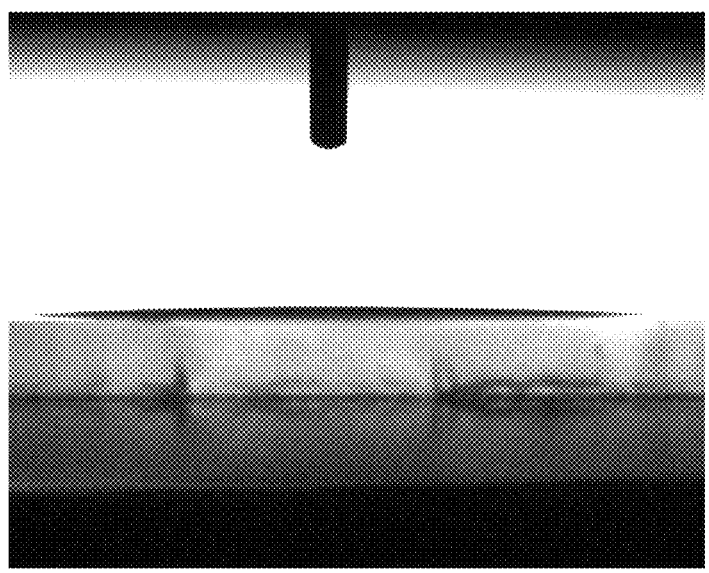
FIG. 6 is a contact angle image of a self-cleaning nano heat-insulation coating.

A drop of water was dripped on the self-cleaning nano heat-insulation coating, and a photo of the contact angle was taken. As shown in FIG. 6, it can be seen that the contact angle is almost 0°. Thus the self-cleaning nano heat-insulation coating has a super-hydrophilic self-cleaning effect.

Second Example 13 parts by weight of $WCl_6$, 2 parts by weight of $CsOH.5H_2O$, 40 parts by weight of acetic acid and 20 parts by weight of PVP were stirred together to obtain a first mixture. The first mixture was heated to 70° C. and maintained at this temperature for 1.5 h. Then, the first mixture was further heated to 220° C., reacted for 20 h at this temperature, then centrifuged and oven dried, to obtain cesium tungsten bronze nanoparticles.

15 parts by weight of $TiCl_4$ and 40 parts by weight of anhydrous ethanol were mixed, to obtain a second mixture. Then, the second mixture was reacted at 180° C. for 8 h, and then centrifuged and oven dried, to obtain $TiO_2$ nanoparticles.

50 parts by weight of cesium tungsten bronze nanoparticles, 10 parts by weight of $TiO_2$ nanoparticles, 2 parts by weight of sodium polyacrylate coupling agent (SN5040) and 40 parts by weight of deionized water were ball milled, to obtain an aqueous slurry containing cesium tungsten bronze/$TiO_2$ composite particles, which can be used as a self-cleaning nano heat-insulation coating material. The self-cleaning nano heat-insulation coating material is uniform and stable.

Third Example 15 parts by weight of $WCl_6$, 4 parts by weight of $CsOH.5H_2O$, 30 parts by weight of acetic acid and 15 parts by weight of PVP were stirred together to obtain a first mixture. The first mixture was heated to 70° C. and maintained at this temperature for 1 h. Then, the first mixture was further heated to 240° C., reacted for 30 h at this temperature, then centrifuged and oven dried, to obtain cesium tungsten bronze nanoparticles.

12 parts by weight of $TiCl_4$ and 30 parts by weight of anhydrous ethanol were mixed, to obtain a second mixture. Then, the second mixture was reacted at 180° C. for 8 h, and then centrifuged and oven dried, to obtain $TiO_2$ nanoparticles.

45 parts by weight of cesium tungsten bronze nanoparticles, 8 parts by weight of $TiO_2$ nanoparticles, 2 parts by weight of sodium polyacrylate coupling agent (SN5040) and 50 parts by weight of deionized water were ball milled, to obtain an aqueous slurry containing cesium tungsten bronze/$TiO_2$ composite particles, which can be used as a self-cleaning nano heat-insulation coating material. The self-cleaning nano heat-insulation coating material is uniform and stable.

In the present disclosure, cesium tungsten bronze nanoparticles are prepared through hydrothermal method. The cesium tungsten bronze nanoparticles have a large specific surface area, thus is beneficial to improving infrared absorptivity. $TiO_2$ nanoparticles have a good dispersibility in water, and virtually does not block visible light.

Further, in the present disclosure, an aqueous slurry containing cesium tungsten bronze/$TiO_2$ composite particles is prepared by ball milling and dispersing, in which the well-dispersed cesium tungsten bronze nanoparticles and $TiO_2$ nanoparticles are beneficial to improving visible light transmittance and infrared blocking performance of the coating.

A coating obtained by applying the self-cleaning nano heat-insulation coating material of the present disclosure has a good hydrophilicity which prevents contamination of the nano-coating by organic oils and inorganic dusts, thereby greatly enhancing the anti-fouling performance and extending the service life of the coating.

The self-cleaning nano heat-insulation coating material of the present disclosure is a water-based heat-insulation coating material, which has low content of volatile organic compounds (VOCs) and causes no hazards to the environment and the health of construction workers and users.

It should be understood that improvements or replacements can be made by those skilled in the art based on the above description, and all such improvements and replacements shall fall within the protection scope of the appended claims of the present disclosure

The invention claimed is:

1. A method for preparing a cesium tungsten bronze-based self-cleaning nano heat-insulation coating material, comprising:
    preparing cesium tungsten bronze nanoparticles by hydrothermal method using $WCl_6$ and $CsOH.5H_2O$ as raw materials, PVP as a surfactant and acetic acid as an acid catalyst;
    preparing $TiO_2$ nanoparticles from $TiCl_4$ by reacting $TiCl_4$ with an anhydrous ethanol solvothermally; and
    ball milling and dispersing the cesium tungsten bronze nanoparticles, the $TiO_2$ nanoparticles, a silane coupling agent, and water so as to obtain an aqueous slurry containing cesium tungsten bronze/$TiO_2$ composite particles; and
    adjusting the concentration of said aqueous slurry to obtain a self-cleaning nano heat-insulation coating material.

2. The preparation method according to claim 1, wherein preparing the cesium tungsten bronze nanoparticles comprises:
    stirring 10-15 parts by weight of $WCl_6$, 2-4 parts by weight of $CsOH.5H_2O$, 30-40 parts by weight of acetic acid, and 15-20 parts by weight of PVP together, to obtain a first mixture; and
    heating the first mixture to 70-80° C., and maintaining the first mixture at this temperature for 1 h-2 h; and then heating the first mixture further to 220-240° C., and reacting the first mixture for 20 h-30 h at this temperature, followed by centrifugation and oven drying, to obtain the cesium tungsten bronze nanoparticles.

3. The preparation method according to claim 1, wherein preparing $TiO_2$ nanoparticles from $TiCl_4$ comprises:

mixing 10-15 parts by weight of TiCl$_4$ and 30-40 parts by weight of anhydrous ethanol solvothermally, to obtain a second mixture; and then reacting the second mixture at 180° C. for 8 h, followed by centrifuging and oven drying the second mixture to obtain TiO$_2$ nanoparticles.

4. The preparation method according to claim 1, wherein ball milling and dispersing comprises:

ball milling 40-50 parts by weight of cesium tungsten bronze nanoparticles, 5-10 parts by weight of TiO$_2$ nanoparticles, 1-2 parts by weight of sodium polyacrylate coupling agent- and 40-50 parts by weight of deionized water, to obtain an aqueous slurry containing cesium tungsten bronze/TiO$_2$ composite particles.

5. The preparation method according to claim 4, wherein the rotation speed of ball mill machine for the ball milling is 500 r/min-5000 r/min, and the ball milling time is 4 h-12 h.

6. A self-cleaning nano heat-insulation coating material, prepared by the preparation method according to claim 1.

7. A self-cleaning nano heat-insulation coating material, prepared by the preparation method according to claim 4.

* * * * *